UNITED STATES PATENT OFFICE.

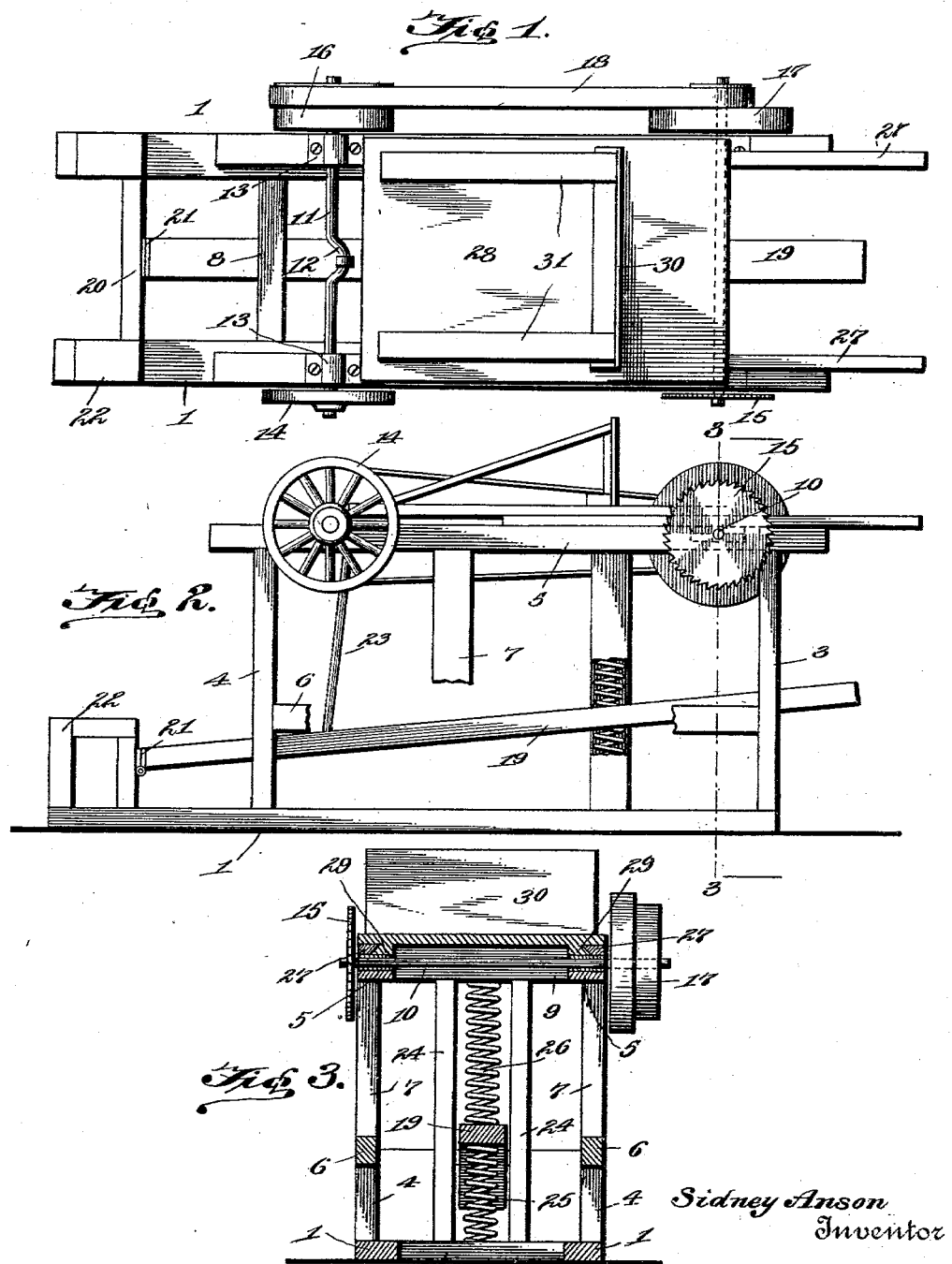

SIDNEY ANSON, OF TOLEDO, OHIO.

SAWING-MACHINE.

SPECIFICATION forming part of Letters Patent No. 720,873, dated February 17, 1903.

Application filed June 26, 1902. Serial No. 113,275. (No model.)

*To all whom it may concern:*

Be it known that I, SIDNEY ANSON, a citizen of the United States, residing at Toledo, in the county of Lucas and State of Ohio, have invented a new and useful Sawing-Machine, of which the following is a specification.

This invention relates to wood-sawing machines, and is designed to provide an improved foot-operated machine wherein the treadle and the carriage are mounted for convenient and simultaneous manipulation by a single operator standing at the front of the machine, whereby the machine may be effectually driven and the work sawed by a single operator.

Another object is to arrange the drive and saw shafts so as to present an unobstructed top to the frame and to utilize this unobstructed top portion for mounting the carriage in convenient reach of the operator when standing at the treadle.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a top plan view of a wood-sawing machine constructed in accordance with the present invention. Fig. 2 is a side elevation, parts being broken away. Fig. 3 is a cross-sectional view on the line 3 3 of Fig. 2.

Like characters of reference designate corresponding parts in all of the figures of the drawings.

In carrying out the present invention I have provided two longitudinal base-sills 1, which are connected by cross-bars 2. Two front uprights 3 rise from the front ends of the sills and two rear uprights 4 rise from the sills at a predetermined distance from the rear ends thereof. The corresponding front and rear uprights are connected by upper and lower beams 5 and 6, respectively, and suitable upright braces 7 extend between these beams. The upper portions of the rear uprights are connected by a cross-bar 8, and there is another cross-bar 9 connecting the beams 5 in rear of the uprights 3, the space between the front uprights being entirely open.

Near the front of the frame and in rear of the front uprights there is mounted a saw-shaft 10, the opposite ends of which project beyond the frame, and the shaft is mounted in bearings let into the upper side beams 5, so that the shaft may lie entirely below the top of said beams to obviate projections. At the rear of the frame is a transversely-disposed drive-shaft 11, which projects at opposite sides of the frame and has an intermediate crank 12. The bearing-boxes 13 are mounted upon the top of the beams 5, and from their centers to their forward ends are greater in length than the crank for a purpose that will be hereinafter described. Upon one end of the drive-shaft is a fly-wheel 14, and upon the corresponding end of the saw-shaft is a circular saw 15, while the corresponding opposite ends of the two shafts are provided with belt-pulleys 16 and 17, respectively, over which runs an endless belt 18, whereby power is transmitted from the drive-shaft to the saw-shaft.

For operating the drive-shaft there is provided a treadle 19, which is disposed longitudinally between the sides of the frame and projects in front thereof, so as to be in position for convenient manipulation for the foot of the operator. The rear end of the treadle is terminated short of the rear ends of the base-sills and has a fulcrum connection with a cross-bar 20 through the medium of a hinge 21. The cross-bar 20 extends across the sills 1 in rear of the rear uprights 4 and is supported in place by the braces 22. An upstanding connecting-rod 23 extends between the crank of the drive-shaft and the treadle.

As best indicated in Fig. 3, it will be seen that the forward portion of the treadle works between a pair of upright guide-bars 24, which have their upper ends connected to the cross-bar 9 and their lower ends connected to the corresponding cross-bar which connects the sills 1. A coiled spring 25 is interposed between the lower cross-bar and the lower side of the treadle, and another coiled spring 26 is interposed between the upper side of the treadle and the under side of the upper cross-bar 9.

Upon the upper sides of the top beams of the frame are the track members 27, which project in front of the frame and terminate short of the drive-shaft and are disposed near the outer edges of the beams so as to expose the inner portions of the tops thereof. The inner lower edges of the tracks are channeled or undercut, thereby forming guideways. A saw-carriage 28 is mounted upon the tracks and is provided upon its under side with opposite longitudinal guide-strips 29, the outer edges of which are beveled or otherwise shaped to fit into the undercut or channeled portions of the tracks, so as to guide the carriage in its movement and to prevent upward displacement thereof. An abutment 30 rises from the carriage in rear of the front thereof and is supported in an upright position by means of inclined braces 31, running from the back of the carriage.

From the foregoing description it will be seen that the carriage is mounted to travel toward and away from the drive-shaft and over the saw-shaft, so as to be under the control of the operator, who stands at the front of the machine and manipulates the latter by the treadle 19, whereby the entire machine may be manipulated by a single attendant.

A very important feature of the present invention resides in having the bearing-boxes 13 of the drive-shaft project in front of the crank 12 and also in the path of the rearward movement of the carriage, whereby the boxes form stops to limit the rearward movement of the carriage and stop the latter short of the path of the crank, so as to prevent contact with these two parts. Moreover, the pulley 17 is provided at its inner end with an external annular enlargement to give weight to the pulley in order that it may also serve in the capacity of a balance-wheel.

Other important advantages of the present device are that the two shafts are disposed in a convenient position for oiling and also to evenly balance the frame, the interval between the operator and the saw is unobstructed, and all of the movable parts of the machine are disposed in rear of the saw, and therefore the operator is not subject to injury therefrom when operating the machine.

What I claim is—

In a sawing-machine, the combination of a frame provided with a track extending rearward from its front end, a reciprocating carriage interlocked with the track, a saw-shaft mounted on the frame at the front end of the track and located below the plane of the carriage and provided with a saw, a drive-shaft journaled in suitable bearings at the rear end of the track and arranged in the path of and forming a stop for the carriage to enable the same to be thrown backward quickly without disengaging it from the track, connections between the shafts, and a treadle disposed longitudinally of the track and located within the lower portion of the frame and connected with the drive-shaft, said treadle being extended from the front of the frame, whereby the carriage and the treadle are adapted to be simultaneously actuated by the operator, substantially as described.

In testimony that I claim the foregoing as my own I have hereto affixed my signature in the presence of two witnesses.

SIDNEY ANSON.

Witnesses:
ELISHA B. SOUTHARD,
WARREN C. PALTZ.